(12) United States Patent
Takeyama et al.

(10) Patent No.: US 7,139,453 B2
(45) Date of Patent: Nov. 21, 2006

(54) VARIABLE DISPERSION COMPENSATOR UTILIZING WAVELENGTH CONVERSION

(75) Inventors: Tomoaki Takeyama, Yokohama (JP); Shinya Inagaki, Shinjuku (JP); Keiko Sasaki, Yokohama (JP)

(73) Assignee: Fujitsu Limited, Kanagawa (JP)

(*) Notice: Subject to any disclaimer, the term of this patent is extended or adjusted under 35 U.S.C. 154(b) by 74 days.

(21) Appl. No.: 10/872,470

(22) Filed: Jun. 22, 2004

(65) Prior Publication Data

US 2004/0258352 A1 Dec. 23, 2004

(30) Foreign Application Priority Data

Jun. 23, 2003 (JP) ............... 2003-178443

(51) Int. Cl.
*G02B 6/26* (2006.01)
*H04J 14/02* (2006.01)
*H01S 3/00* (2006.01)

(52) U.S. Cl. .................. 385/27; 385/122; 385/123; 398/81; 398/158; 398/159; 398/160; 359/326; 359/333; 359/341.1; 359/337.5

(58) Field of Classification Search ............... 385/122, 385/123, 124, 27, 42; 398/79, 81, 158, 159, 398/160, 141, 147; 359/326, 333, 341.1, 359/337.5

See application file for complete search history.

(56) References Cited

U.S. PATENT DOCUMENTS

| | | | |
|---|---|---|---|
| 5,768,302 A * | 6/1998 | Wallace et al. | 372/21 |
| 6,115,173 A * | 9/2000 | Tanaka et al. | 359/333 |
| 6,665,113 B1 * | 12/2003 | Aso et al. | 359/326 |
| 6,751,421 B1 * | 6/2004 | Ranka et al. | 398/141 |
| 7,061,664 B1 * | 6/2006 | Aso et al. | 359/332 |
| 2001/0024306 A1 | 9/2001 | Okuno | 385/147 X |
| 2004/0258352 A1 * | 12/2004 | Takeyama et al. | 385/27 |

* cited by examiner

*Primary Examiner*—Brian M. Healy
(74) *Attorney, Agent, or Firm*—Bingham McCutchen LLP (57) ABSTRACT

A dispersion compensator and method of dispersion compensation in which an input light is converted to a selected second wavelength, the converted light beam having the second wavelength is dispersion compensated in an amount dependent upon the second wavelength, and the compensated light beam having the second wavelength is converted to the first wavelength.

65 Claims, 6 Drawing Sheets

VARIABLE DISPERSION COMPENSATOR UTILIZING WAVELENGTH CONVERSION

BACKGROUND OF THE INVENTION

1. Field of the Invention

The present invention relates to a variable dispersion compensator to be used for optical communication systems and particularly to a variable dispersion compensator which can vary an amount of dispersion compensation.

2. Description of the Related Art

In recent years, the requirement in the capacity for transmission of information has increased remarkably and the formation of large capacity and flexible networks is in particular demand in the optical transmission system used for the main link system. In order to cover the demand for such an optical transmission system, the Wavelength Division Multiplex (WDM) communication technique has been widely used. In WDM transmission, transmission capacity is increased by multiplexing the light beams of a plurality of different wavelengths and simultaneously transmitting a plurality of signals with only one optical fiber.

When a signal beam is transmitted with an optical fiber, the wavelength is dispersed and distortion is generated in the signal beam because group velocity of light beams is different depending on their wavelengths. As the transmission distance becomes longer, distortion of signal beam waveform increases due to the accumulation of dispersion of the wavelengths of a signal beam. When the distortion becomes large, a reception error is generated and thereby the transmission quality of signal is deteriorated. Accordingly, a dispersion compensator is used to realize long distance transmission. In this case, dispersion of the wavelengths of a signal beam is compensated for by providing chromatic dispersion of inverse sign to that of the transmission line to the signal beam in a repeating station.

One type of dispersion compensator utilizes a dispersion compensation fiber (DCF) which has chromatic dispersion of inverse sign to that of the transmission line. The DCF and a compensator utilizing fiber grating are known as a dispersion compensation device.

When the number of wavelengths of signal beams to be wavelength-multiplexed is increased to increase transmission capacity, the signal wavelength band becomes wide. In general, the dispersion characteristic of optical fiber includes a property which depends on wavelength, which is called dispersion slope and which linearly increases depending on the wavelength. In WDM transmission, since chromatic dispersion of each wavelength of the multiplexed signal beams must be compensated, the chromatic dispersion must be compensated for the entire band of signals. Therefore, a dispersion compensator is required to provide not only an amount of chromatic dispersion compensation, but also to provide a dispersion slope, both which are equal to but of inverse sign to the chromatic dispersion characteristics of the transmission line.

A dispersion compensator preferably provides a dispersion compensation amount that cancels the amount of dispersion in combination with the chromatic dispersion of an input signal beam. The U.S. Pat. No. 2001/0024306 discloses a dispersion compensator which can vary the dispersion compensation amount by switching a plurality of dispersion compensation modules in which dispersion amounts are fixed.

For compensation of chromatic dispersion in a transmission line with a dispersion compensator, a dispersion compensation device having a chromatic dispersion of the same absolute value as that of the transmission line and the dispersion slope is necessary. In order to compensate for chromatic dispersions of the transmission lines at different transmission distances and in different installation conditions, it is required to provide dispersion compensators having various dispersion characteristics considering the range of the desired transmission distance.

In addition, since a dispersion compensation device such as DCF or the like shows considerable fluctuation in the amount of chromatic dispersion compensation and dispersion slope due to the manufacturing method, it is difficult to provide a dispersion compensation device having the desired amount of dispersion compensation and dispersion slope.

Chromatic dispersion and dispersion slope of a transmission line can be compensated for by utilizing a dispersion compensator that can vary the amount of dispersion compensation by switching a plurality of dispersion compensation modules, but a plurality of dispersion compensation devices must be provided, resulting in increase in the number of components and rise of manufacturing cost.

SUMMARY OF THE INVENTION

A dispersion compensator of the present invention is configured to convert wavelength of an input light beam for dispersion compensation and thereafter provides an output through the next wavelength conversion. This dispersion compensator is characterized in that conversion wavelength for wavelength conversion is varied to change amount of dispersion compensation by utilizing a dispersion compensating portion which varies amount of dispersion compensation with the wavelength.

It is usually difficult to vary the amount of dispersion compensation of the dispersion compensating portion to the desired amount but it is also difficult to obtain the desired amount of dispersion compensation because signal loss increases. Meanwhile, since amount of wavelength conversion in the wavelength conversion is possible, when the characteristic of dispersion compensating portion which changes in the amount of dispersion compensation with the wavelength is measured previously, dispersion compensation can be realized in the desired amount of dispersion by controlling amount of wavelength conversion.

For example, in the case where degenerated four-wave mixing (DFWM) is utilized, amount of dispersion compensation can be varied by changing wavelength of the pumped light beam in the DFWM.

DETAILED DESCRIPTION OF THE PREFERRED EMBODIMENTS

According to a first embodiment of the present invention, a dispersion compensator comprises a first wavelength converting portion for outputting a first light beam which is converted in the wavelength of an input light beam, a dispersion compensating portion which provides different amounts of dispersion compensation depending on wavelength by receiving a first light beam as an input and then outputting a second light beam which is compensated in chromatic dispersion, and a second wavelength converting portion which receives the second light beam as an input and outputs a third light beam which is converted in the wavelength.

According to a second embodiment of the present invention, the dispersion compensator comprises an optical component which includes a first to a third ports to output the light beam input to the first port to the second port and to output the light beam input to the second port to the third port, a first wavelength converting portion connected at one end to the second port of the optical component to output the input light beam through wavelength conversion, a dispersion compensating portion connected at one end to the other end of the wavelength converting portion to provide different amount of dispersion compensation depending on the wavelength by compensating for the chromatic dispersion of the input light beam, and a reflecting portion connected at one end to the dispersion compensating portion to reflect the input light beam.

The dispersion compensator in the structure described above uses a dispersion compensating portion which varies the amount of dispersion compensation with the wavelength and is therefore capable of changing the amount of dispersion compensation to provide an output by varying conversion wavelength in the wavelength conversion.

According to a third embodiment of the present invention, the dispersion compensator comprises a first light source for sending a first excited light beam, a first wavelength converting portion for outputting a first light beam obtained by wavelength conversion of the input light beam with non-linear optical effect between the input light beam and the first excited light beam, a dispersion compensating portion which receives the first light beam as an input and outputs a second light beam compensated in the chromatic dispersion to provide different amount of dispersion compensation depending on the wavelength, a second light source for sending a second excited light beam, and a second wavelength converting portion for providing a third light beam obtained by wavelength conversion of the second light beam with non-linear optical effect between the second light beam and the second excited light beam.

According to the fourth embodiment of the present invention, the dispersion compensator comprises an optical component which includes a first to a third ports to output the input light beam input to the first port to the second port and output the light beam input to the second port to the third port, a light source for sending the excited light beam, a first wavelength converting portion connected at one end to the second port of the optical component to provide an output by converting wavelength of the input light beam with non-linear optical effect between the input light beam and the excited light beam, a dispersion compensating portion connected at one end to the other end of the wavelength converting portion to provide different amount of dispersion compensation by compensating for chromatic dispersion of the input light beam, and a reflecting portion connected at one end of the dispersion compensating portion to reflect the input light beam.

According to the structures of the third and fourth embodiment of the present invention, the dispersion compensator utilizes a dispersion compensating portion which varies the amount of dispersion compensation with the wavelength and thereby can change amount of dispersion compensation as an output by controlling the excited light beam because the conversion wavelength in wavelength conversion with non-linear optical effect can be controlled by controlling the excited light beam.

Moreover, adverse effects such as non-linear effects due to the input of the excited light beam to the dispersion compensating portion can be prevented by providing a filter, which can cut off the light beam of the wavelength of the excited light beam, between the wavelength converting portion and the dispersion compensating portion.

In addition, mixing of the light beam not converted in the wavelength converting portion into an output of the dispersion compensator can also be prevented by providing the filter, which can cut off the light beam of the wavelength of the excited light beam, between the wavelength converting portion and the dispersion compensating portion.

The preferred embodiments of the present invention will be described with reference to the accompanying drawings.

First, the degenerated four-wave mixing (DFWM) used for the wavelength converting portion of this embodiment will be described.

Figure 2:
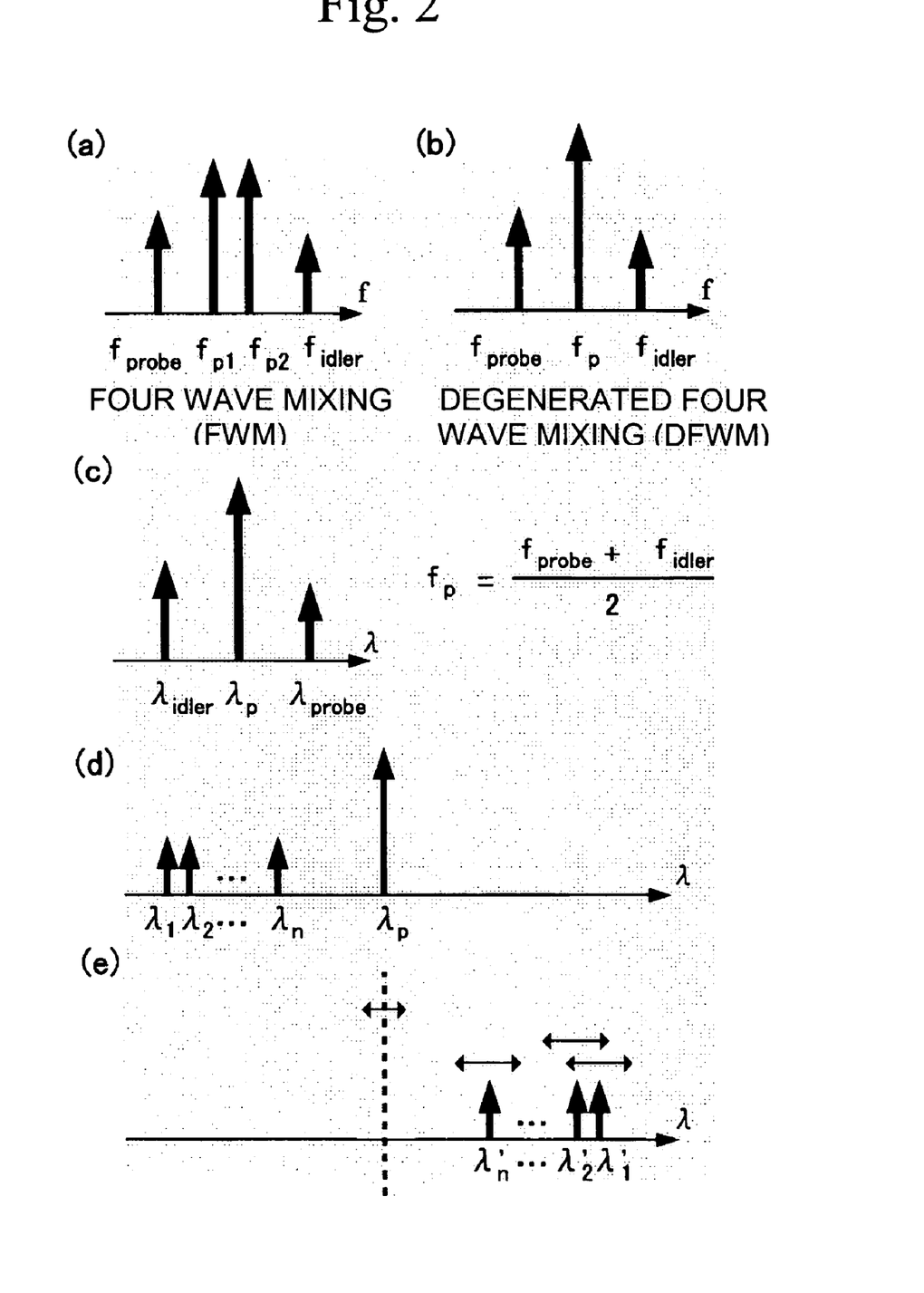
FIGS. 2(a) to 2(e) are diagrams illustrating wavelength conversion due to the mixing of four light beam wavelengths.

The four-wave mixing (FWM) is one of the non-linear optical effects generated in an optical fiber resulting from the third order polarization of the dielectric constant. In the four-wave mixing (FWM) in the optical fiber, an idler light beam (frequency: $f_{idler}$) satisfying the phase matching condition ($f_{idler}=F_{p1}+f_{p2}-f_{probe}$ (1)) is generated as illustrated in FIG. 2(a) when the pumped light beams of different frequencies (frequency: fp1, fp2) and a probe light beam (frequency: $f_{probe}$) are input.

Particularly, the four-wave mixing (FWM) where a couple of pumped light beams have equal frequency, namely fp1=fp2=fp is called degenerated four-wave mixing (DFWM). In this degenerated four-wave mixing (DFWM), the phase matching condition $f_{idler}=2f_p-f_{probe}$ (2) may be obtained as illustrated in FIG. 2(b) and the idler light beam is generated for the frequency of the pumped light beam at the frequency which is symmetrical to the frequency of probe light beam.

FIG. 2(c) illustrates the relationship among the pumped light beam, probe light beam and idler light beam in the degenerated four-wave mixing (DFWM) of FIG. 2(b) with the wavelength plotted on the horizontal axis. When difference between the pumped light beam wavelength $\lambda_p$ and probe light beam wavelength $\lambda_{probe}$ is sufficiently smaller than the wavelength of pumped light beam, the idler light beam wavelength $\lambda_{idler}$ is almost symmetrical to $\lambda_{probe}$ for $\lambda_p$. For example, when $\lambda_p$ is 1560 nm and $\lambda_{probe}$ is 1540 nm, $\lambda_{idler}$ becomes 1580.5 nm.

On the contrary, it can be obtained from the phase matching condition described above that wavelength of the idler light beam becomes equal to the wavelength $\lambda_{probe}$ of the original probe light beam when the probe light beam in the wavelength $\lambda_{idler}$ of the idler light beam and the pumped light beam of wavelength $\lambda_p$ are input to the optical fiber. Namely, the light beam converted in the wavelength with degenerated four-wave mixing (DFWM) is converted again in wavelength to the original wavelength with repeated degenerated four-wave mixing DFWM by the pumped light beam of the identical frequency.

The idler light beam DFWM generated when the probe light beams of a plurality of different wavelengths and the pumped light beam are input to an optical fiber is generated in the wavelength satisfying the phase matching condition between the probe light beams of respective wavelengths and the pumped light beam. Therefore, when the wavelength division multiplexing (WDM) signal beam and the pumped light beam are input, the WDM signal beams are simultaneously wavelength-converted with DFWM and are then output.

FIGS. 2(d) and 2(e) illustrate the relationship of the wavelength conversion when the WDM signal beam and the pumped light beam are input. When the WDM signal beams in the wavelengths $\lambda_1$ to $\lambda_n$ (n: is a natural number) illustrated in FIG. 2(d) and the pumped light beam in the wavelength $\lambda$p are input to the optical fiber having the higher non-linearity, the wavelength converted WDM signal beams of the wavelengths $\lambda'_1$ to $\lambda'_n$ illustrated in FIG. 2(e) are generated with degenerated four-wave mixing (DFWM). The relationship between $\lambda_1$ to $\lambda_n$ and $\lambda'_1$ to $\lambda'_n$ satisfies the phase matching condition described above and the values of $\lambda'_1$ to $\lambda'_n$ vary when the wavelength $\lambda_p$ of the pumped light beam is changed. Namely, since $\lambda'_i$(i=1 to n) is almost symmetrical to $\lambda_i$, the wavelength $\lambda'_i$ also increases with increment of $\lambda_p$.

The dispersion compensator of the present invention is capable of varying the amount of dispersion compensation through combination of the wavelength converting portion for varying conversion wavelengths through change of the wavelength of the pumped light beam in DFWM and the dispersion compensating portion for providing different amounts of dispersion compensation depending on the wavelength.

Figure 1:
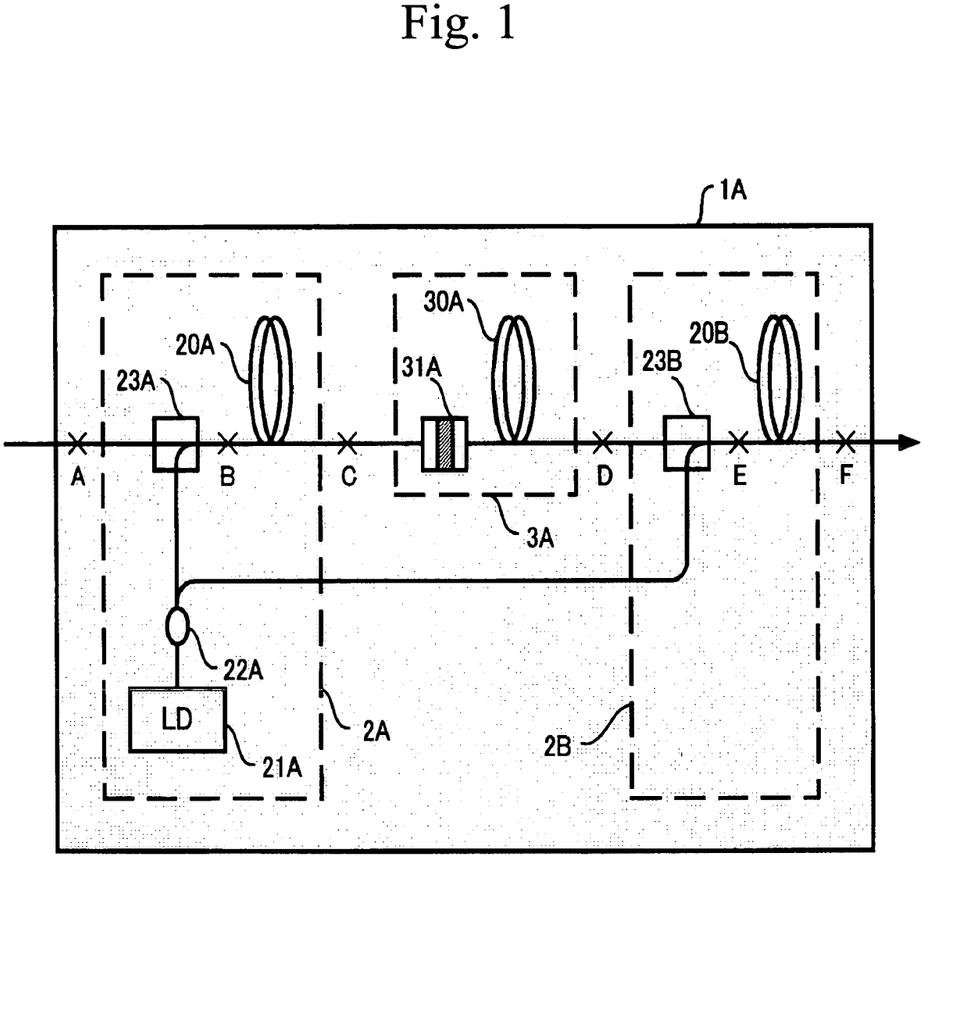
FIG. 1 is a diagram illustrating a dispersion compensator based on a first embodiment of the present invention.

FIG. 1 is a diagram illustrating the dispersion compensator based on the first embodiment of the present invention. In FIG. 1, the dispersion compensator 1A of the first embodiment is composed of wavelength converting portions 2A, 2B and a dispersion compensating portion 3A.

The wavelength converting portion 2A receives, as an input, the WDM signal beam input to the dispersion compensator 1A and provides an output to the dispersion compensating portion 3A through wavelength conversion and is provided with a laser diode (LD) 21A, a coupler 22A, a WDM coupler 23A, and a highly non-linear fiber 20A.

The laser diode (LD) 21A outputs an excited light beam which becomes the pumped light beam in DFWM in the highly non-linear fibers 20A, and 20B and changes the output wavelength of the excited light beam with external control.

The coupler 22A branches the excited light beam sent from the LD 21A to the WDM couplers 23A and 23B. The WDM coupler 23A multiplexes the excited light beam input through the coupler 22A and the WDM signal beam input to the wavelength converting portion 2A and then outputs the multiplexed signals to the highly non-linear fiber 20A.

The highly non-linear fiber 20A outputs the idler light beam in which the input WDM signal beam is wavelength-converted with the degenerated four-wave mixing (DFWM), where the light beam input through the coupler 22A and WDM coupler 23A is defined as the pumped light beam and the WDM signal beam input through the WDM coupler 23A is defined as the probe light beam.

The dispersion compensating portion 3A compensates for chromatic dispersion of the WDM signal beam input from the wavelength converting portion 2A and then outputs this signal to the wavelength converting portion 2B and is provided, therefore, with a dispersion compensation fiber (DCF) 30A and a filter 31A.

The dispersion compensation fiber (DCF) 30A has the dispersion characteristic to change the amount of dispersion compensation with the wavelength and compensates for dispersion slope and chromatic dispersion of the WDM signal beam in which the wavelength is converted with the wavelength converting portion 2A.

The filter 31A filters the WDM signal beam input to the dispersion compensating portion 3A from the wavelength converting portion 2A and then outputs the WDM signal beam to the dispersion compensation filter (DCF) 30A.

The wavelength converting portion 2B converts the wavelength of the WDM signal beam input from the wavelength converting portion 2A and provides an output to the output of the dispersion compensator 1A and is moreover provided with the WDM coupler 23B and the highly non-linear fiber 20B.

The WDM coupler 23B multiplexes the excited light beam input through the coupler 22A and is sent from the laser diode (LD) 21A and the WDM signal beam input from the dispersion compensating portion 3A and then provides an output to the highly non-linear fiber 20B.

The highly non-linear fiber 20B outputs the idler light beam obtained by wavelength conversion of the input WDM signal beam with the degenerated four-wave mixing (DFWM) in which the light beam from the LD 21A input through the coupler 22A and WDM coupler 23B is defined as the pumped light beam and the WDM signal beam input through the WDM coupler 23B from the dispersion compensating portion 3A as the probe light beam.

Next, operation of the dispersion compensator based on the first embodiment of the present invention will be described.

Figure 3:
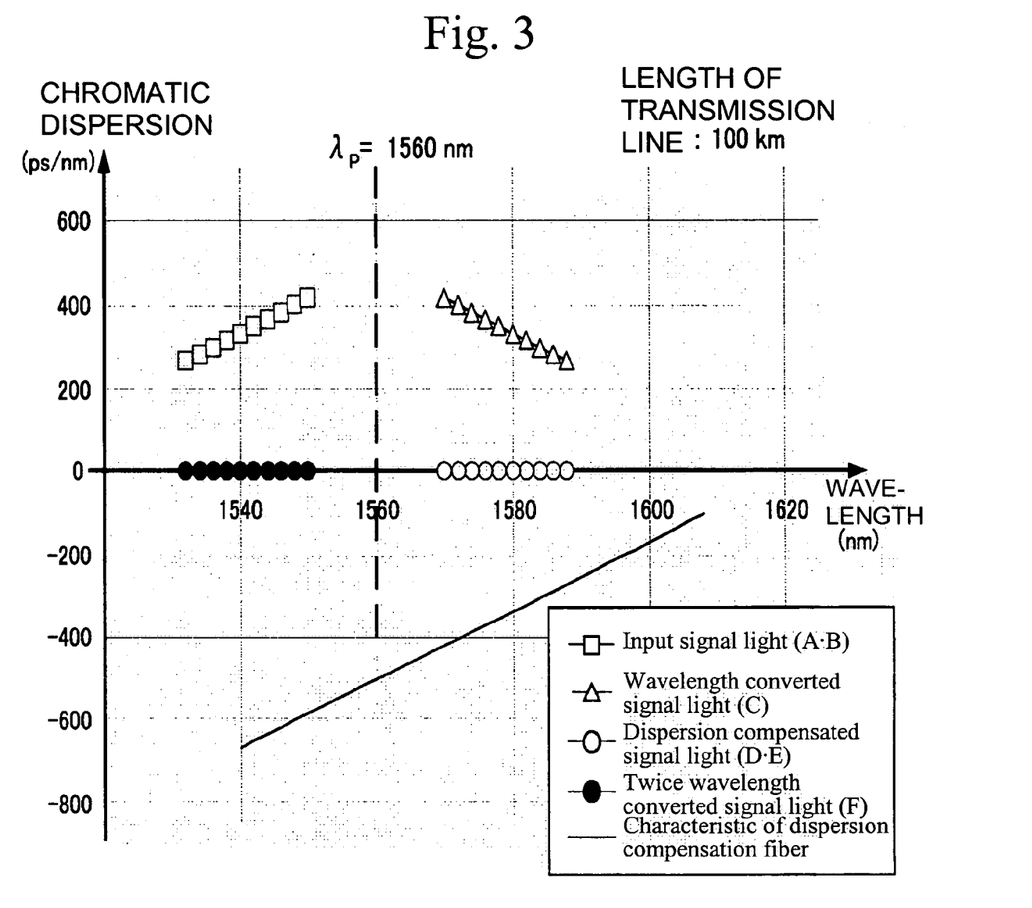
FIG. 3 is a diagram illustrating chromatic dispersion values of signal beam in each process of chromatic dispersion in the present invention.

FIG. 3 illustrates the process of dispersion compensation in the dispersion compensator 1A based on the first embodiment of the light beam obtained after the WDM signal beam multiplexing ten-wave signal beams (wavelength: 1532 nm to 1550 nm) allocated with equal intervals is transmitted for 100 km with a non-zero dispersion shifted single-mode optical fiber (NZDSF). In this figure, the chromatic dispersion value and wavelength are respectively plotted on the vertical axis and horizontal axis. For the light beam in the wavelength of 1550 nm, the NZDSF has the chromatic dispersion of 4.2 (ps/nm/km) and dispersion slope of 0.084 (ps/nm$^2$/km). Therefore, as the transmission distance by the NZDSF becomes longer, chromatic dispersion and dispersion slope of the WDM signal beam are accumulated.

In FIG. 3, the mark □ indicates a chromatic dispersion value of the WDM signal beam input to the dispersion compensator 1A based on the first embodiment, the mark Δ indicates a chromatic dispersion value of the WDM signal beam output from the wavelength converting portion 2A, the mark ○ indicates a chromatic dispersion value of the WDM signal beam of which the dispersion is compensated by the dispersion compensating portion 3A, and the mark ● indicates a chromatic dispersion value of the WDM signal beam which is wavelength-converted again with the wavelength converting portion 2B. Moreover, the line of the chromatic dispersion value drawn in the negative region indicates the dispersion characteristic of the dispersion compensation fiber (DCF) 30A of the dispersion compensating portion 3A.

In this embodiment, the 10-wave WDM signal beams in the wavelengths of 1532 nm to 1550 nm are compensated in dispersion with the dispersion compensator 1A and are then output. Thereafter, these 10-wave WDM signal beams are called respectively λ1 to λ10 in the sequence of shorter wavelengths. For example, the signal beam of the shortest wavelength of 1532 nm is wavelength-converted, dispersion-compensated, wavelength-converted again and then output from the dispersion compensator 1A and this signal beam is called the signal beam λ1 in each process. The signal beams of the other wavelengths are correspondingly named.

Chromatic dispersion of the WDM signal beam input to the dispersion compensator 1A indicated by the mark □ in FIG. 3 is increased with the increase of wavelength depending on the dispersion slope of NZDSF of the transmission line. The WDM signal beam input to the dispersion compensator 1A is then input to the wavelength converting portion 21A, multiplexed with the excited light beam output from the LD 21A in the WDM coupler 23A, and is then input to the highly non-linear fiber 20A.

In the highly non-linear fiber 20A, the DFWMs illustrated in FIGS. 2(b) to 2(e) are generated under the condition that the light beam output from the LD 21A is defined as the pumped light beam and the signal beams λ1 to λ10 of the wavelengths of 1532 nm to 1550 nm are defined as the probe light beams and the signal beams λ1 to λ10 are converted respectively to the light beams in the wavelengths of 1589 nm to 1570 nm indicated with the mark Δ in FIG. 3. The signal beams λ1 to λ10 wavelength-converted with the highly non-linear fiber 20A are output from the wavelength converting portion and is then input to the dispersion compensating portion 3A.

The signal beams λ1 to λ10 input to the dispersion compensating portion 3A are then input to the filter 31A.

As the filter 31A, a filter for shielding the excited light beam wavelength output from the LD 21A, a filter for shielding the wavelength of a light beam not wavelength-converted in the wavelength converting portion 2A, or a filter combining these filters may be used.

In the case where a filter for shielding the excited light beam wavelength transmitted from the LD 21A is used as the filter 31A, this filter 31A shields the light beam which is not converted with DFWM of the highly non-linear fiber 20A and is then output from the wavelength converting portion 2A among the excited light beams transmitted from the LD 21A. The signal beams λ1 to λ10 wavelength-converted by the wavelength converting portion 2A are transmitted through the filter 31A.

Accordingly, since the excited light beam is not input to the DCF 30A provided in the successive stage of the filter 31A, deterioration of signal beam due to generation of non-linear optical phenomenon such as DFWM or the like in the DCF 30A may be prevented.

In the case where a filter for shielding the wavelength of light beam not wavelength-converted in the wavelength converting portion 2A is used as the filter 31A, this filter 31A shields the light beam not converted by DFWM in the highly non-linear fiber 20A and output from the wavelength converting portion 2A among the input signal beams. The signal beams λ1 to λ10 wavelength-converted in the wavelength converting portion 2A are transmitted through the filter 31A.

Accordingly, the signal beam which is not wavelength-converted by both wavelength converting portion 2A and wavelength converting portion 2B is mixed with the signal beam wavelength-converted by both wavelength converting portion 2A and wavelength converting portion 2B to be an equal wavelength as the input light beam and thereby deterioration of signal beam may be prevented. For example, when the input WDM signal beams are all in the C band region (1.55 μm band; about 1.53 μm to about 1.56 μm) and the WDM signal beams after the wavelength conversion are all outside of the C band region, the wavelength of light beam not wavelength-converted with the wavelength converting portion 2A is shielded.

As the excited light beam shielding filter and C band shielding filter, a filter formed of a dielectric multilayer film or the like may be used.

The signal beams that have passed the filter 31A are then input to the DCF 30A. The DCF 30A has the dispersion characteristic illustrated in FIG. 3 and the signal beams λ1 to λ10 having the chromatic dispersion values indicated with the mark Δ in FIG. 3 are output, by the DCF 30A, as the light beams indicated with the mark ○ in FIG. 3 where the dispersion slope and dispersion value become almost zero. The signal beams λ1 to λ10 dispersion compensated with the DCF 30A are then output from the dispersion compensating portion 3A and are then input to the wavelength converting portion 2B.

The signal beams λ1 to λ10 having the chromatic dispersion indicated with the mark ○ in FIG. 3 input to the wavelength converting portion 2B are multiplexed with the excited light beam output from the LD 21A in the WDM coupler 23B and are then input to the highly non-linear fiber 20B.

In the highly non-linear fiber 20A, the DFWMs illustrated in FIGS. 2(b) to 2(e) are generated under the condition that the light beam output from the LD 21A is defined as the pumped light beam and the signal beams λ1 to λ10 where chromatic dispersion is indicated with the mark ○ are defined as the probe light beams and these signal beams λ1 to λ10 are respectively converted to the light beams indicated with the mark ● in FIG. 3.

The excited light beam is input, from the LD 21A, to both highly non-linear fibers 20A and 20B and moreover the signal beam wavelength-converted and output from the highly non-linear fiber 20A is then input to the highly non-linear fiber 20B without change of wavelength in the dispersion compensating portion 3A.

Here, the wavelengths of the pumped light beams of DFWM generated in the highly non-linear fibers 20A and 20B are identical and the wavelength of the idler light beam of DFWM in the highly non-linear fiber 20A is identical to the wavelength of the probe light beam of DFWM generated in the highly non-linear fiber 20B. Accordingly, the wavelength of idler light beam of DFWM in the highly non-linear fiber 20B becomes the wavelength of probe light beam of the highly non-linear fiber 20A, namely each wavelength of the WDM signal beams input to the dispersion compensator 1A.

Accordingly, the signal beams λ1 to λ10 of the wavelengths of 1589 nm to 1570 nm where chromatic dispersion is indicated with the mark ○ are wavelength-converted to the light beams in the wavelengths of 1532 nm to 1550 nm as the original signal beams with DFWM of the highly non-linear fiber 20B, output from the wavelength converting portion 2B as the input signals of the dispersion compensator 1A.

The WDM signal beam input to the dispersion compensator 1A based on this embodiment with the process described above is compensated in the dispersion slope and amount of chromatic dispersion and is then output. In this embodiment, the excited light beam output from the LD 21A is branched with the coupler 22A to make equal the wavelength of the pumped light beams of the highly non-linear fibers 20A and 20B. Thereby, the input WDM signal beam is compensated in chromatic dispersion and is then output with equal wavelength to the input wavelength.

Here, it is also possible, by inserting a filter, which shields the light beam with wavelength equal to that of the excited light beam output from the LD 21A as the successive stage of the highly non-linear fiber 20B of the wavelength converting portion 2B, that the excited light beam output from the LD 21A is not mixed to the output beam of the dispersion compensating portion 1A.

Next, the change in the amount of dispersion compensation in the dispersion compensator 1A based on the first embodiment when the wavelength of the excited light beam output from the LD 21A is varied will be described.

In the case where the WDM signal beam is input, together with the pumped light beam, to the optical fiber as the probe light beam and is wavelength-converted with the DFWM as illustrated in FIGS. 2(d) and 2(e), if the wavelength of pumped light beam is varied, the wavelength of WDM signal beam converted in the wavelength also varies. With the wavelength conversion and change of wavelength of pumped light beam with the dispersion compensating portion to vary the amount of chromatic dispersion compensation depending on the wavelength, amount of chromatic dispersion compensation of the WDM signal beam also changes.

Figure 4:
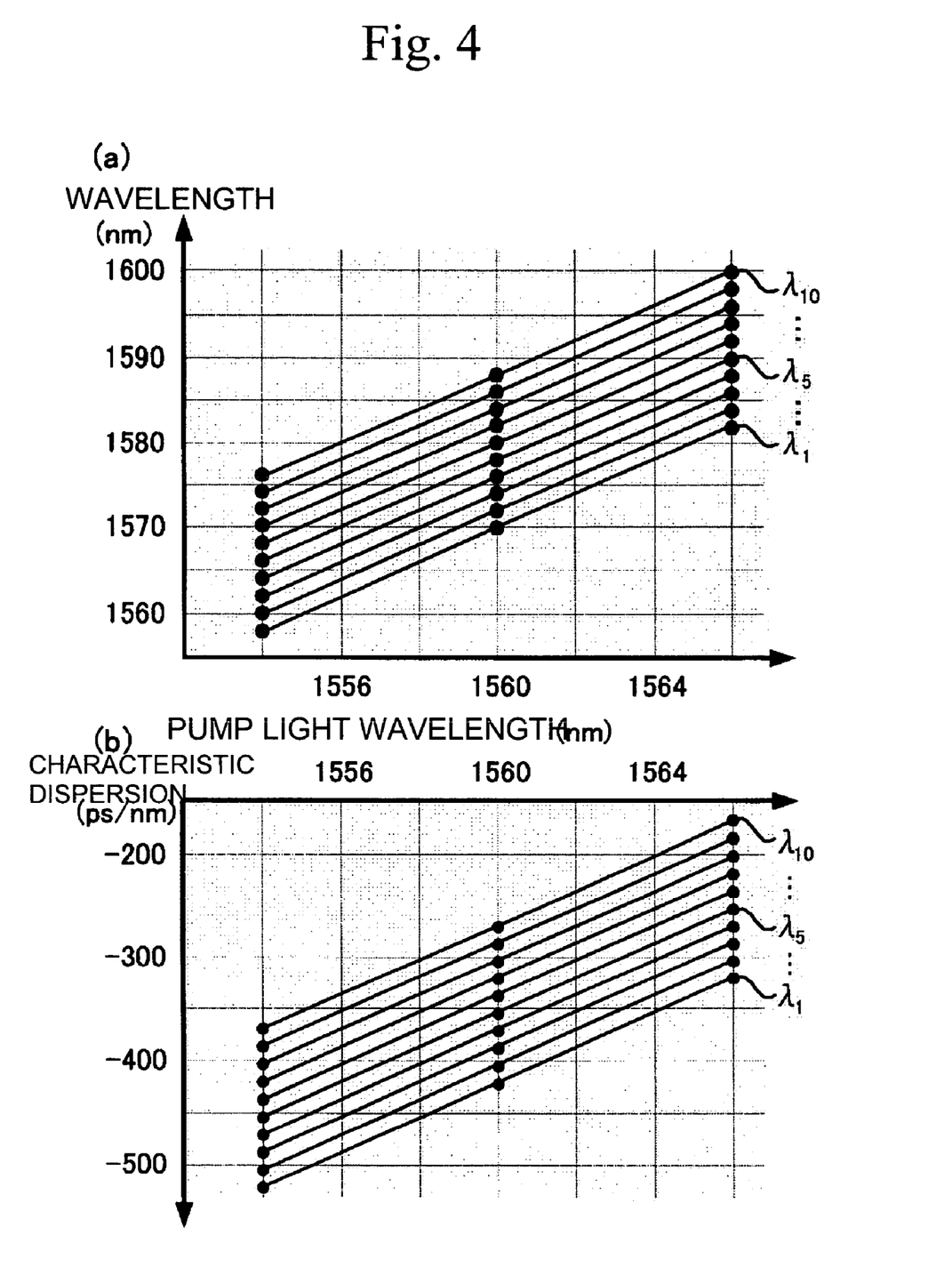
FIGS. 4(a) and 4(b) are diagrams illustrating conversion wavelength and amount of dispersion compensation when the wavelength of pumped light beam is changed.

FIG. 4(a) illustrates the signal beam wavelength after the wavelength conversion when the wavelength of the pumped light beam of the highly non-linear fiber 20A is changed with the excited light beam from the LD 21A when the signal beams λ1 to λ10 of the wavelengths of 1532 nm to 1550 nm are input to the dispersion compensator 1A. In wavelength conversion with DFWM, the wavelength is converted to the wavelength of the idler light beam obtained with formula (2). With increase in the wavelength of the pumped light beam, the wavelength of the converted signal beam also increases.

As the chromatic dispersion values of FIG. 3 are indicated in the negative region, the dispersion characteristic of the DCF 30A is reduced for a increase in wavelength. FIG. 4(b) illustrates the chromatic dispersion amount in the signal beams λ1 to λ10 when the characteristic of DCF 30A and the wavelength of pumped light beam obtained from the wavelength after wavelength conversion of the signal beam illustrated in FIG. 4(a) are varied. As illustrated in FIG. 4(a), the wavelength of the wavelength-converted signal beam increases when the wavelength of the pumped light beam increases, while the dispersion characteristic of DCF 30A is reduced for an increase in wavelength. Therefore, with an increase in wavelength of the pumped light beam, the amount of dispersion compensation of the signal beam is also reduced.

Since the chromatic dispersion compensation amount of the signal beam varies when wavelength of the pumped light beam of DFWM is varied as illustrated in FIG. 4(b), the dispersion slope and dispersion amount of the WDM signal beam having a chromatic dispersion which is different from the dispersion slope and dispersion amount indicated by the mark □ in FIG. 3 are also compensated with the dispersion compensator 1A based on the first embodiment.

Figure 5:
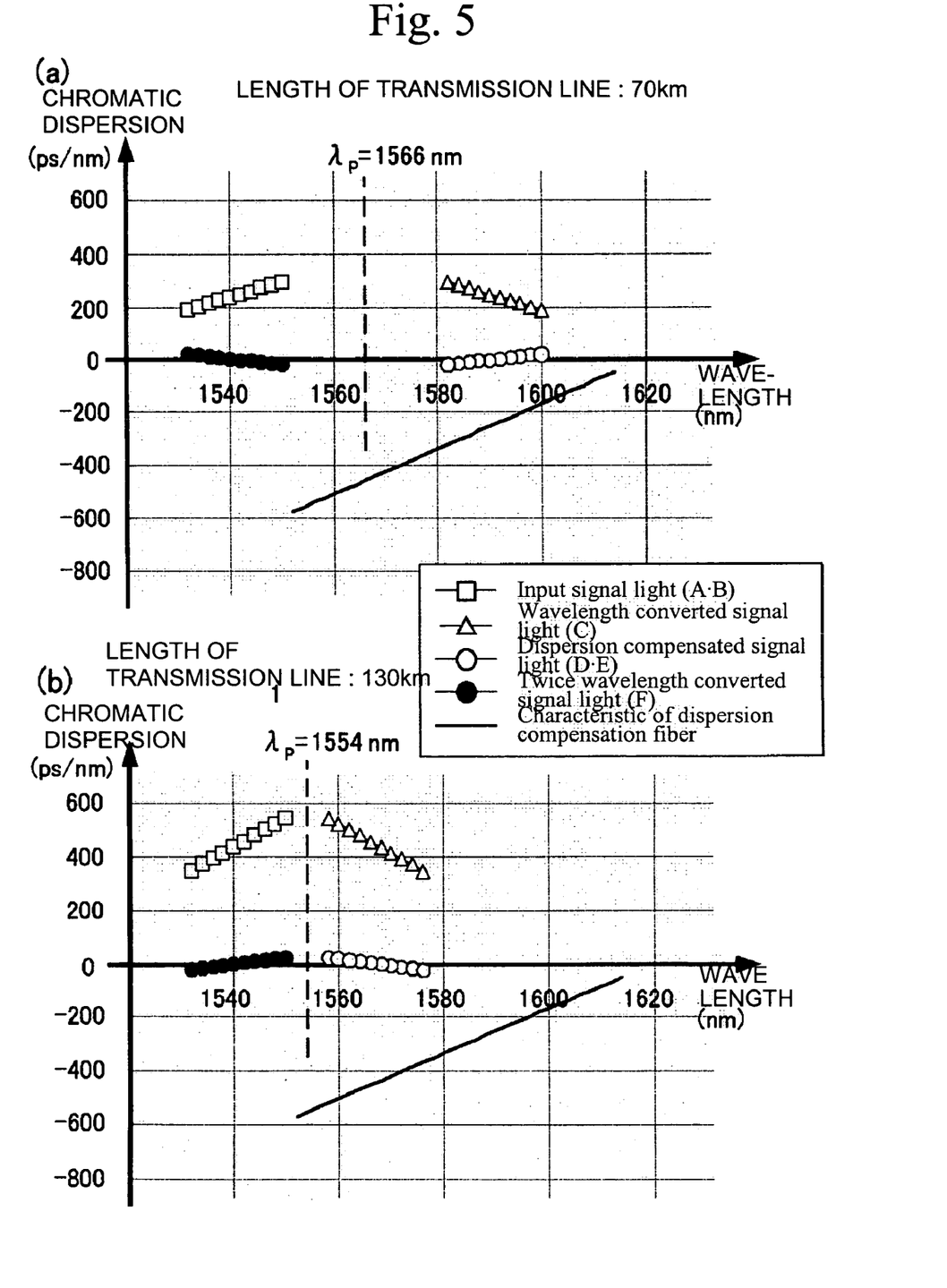
FIGS. 5(a) and 5(b) are diagrams illustrating chromatic dispersion values of signal beams in each process of chromatic dispersion in the present invention.

FIGS. 5(a) and 5(b) respectively illustrate the process by which the 10-wave WDM signal beams in the wavelengths of 1532 nm to 1550 nm are dispersion-compensated, after transmission through NZDSF transmission line for 70 km and 130 km, with the dispersion compensator 1A, and are then output.

In FIG. 5(a), chromatic dispersion, indicated with the mark □, of the WDM signal beam input to the dispersion compensator 1A increases, as in the case of the transmission of 100 km in FIG. 3, with increase of the wavelength due to the dispersion slope of NZDSF in the transmission line, but both dispersion slope and dispersion amount are smaller than that in the transmission of 100 km.

Therefore, since dispersion compensation amount of the DCF 30A is also smaller than that in the transmission of 100 km, the wavelength of pumped light beam becomes 1566 nm which is longer than that in the transmission of 100 km (1560 nm) as illustrated in FIG. 4(b).

The signal beams λ1 to λ10 in the wavelengths of 1532 nm to 1550 nm input to the dispersion compensator 1A are multiplexed with the excited light beam output from the LD 21A with the WDM coupler 23A and are then input to the highly non-linear fiber 20A. Moreover, the signal beams λ1 to λ10 are respectively converted to the light beams in the wavelengths of 1602 nm to 1582 nm indicated with the mark Δ in FIG. 5(a) with the wavelength conversion by the DFWM in the highly non-linear fiber 20A.

The signal beams λ1 to λ10 wavelength-converted in the highly non-linear fiber 20A are input to the DCF 30A and are then output as the light beams which are reduced in dispersion slope and dispersion value indicated with the mark ○ in FIG. 5(a). Since the dispersion slope of the input WDM signal beam is not identical to that of the DCF 30A, a dispersion slope is still remains in the signal beam (○) after the dispersion compensation but the value of this dispersion slope is smaller than that of the input WDM signal beam (□).

The signals that have been dispersion-compensated with the DCF 30A are multiplexed with the excited light beam output from the LD 21A with the WDM coupler 23B and are then input to the highly non-linear fiber 20B. The signal beams λ1 to λ10 are then converted, through the wavelength conversion by the DFWM in the highly non-linear fiber 20B, to the wavelengths of 1532 nm to 1550 nm indicated with the mark ● in FIG. 5(a) and are then output from the dispersion compensator 1A. The wavelength of the light beam wavelength-converted with the highly non-linear fiber 20B is identical to that of the input signal beam as in the case of the transmission for 100 km.

With the process described above, the WDM signal beam input to the dispersion compensator 1A based on this embodiment is compensated, even in the case of transmission for 70 km, in dispersion slope and dispersion amount of the chromatic dispersion even when the dispersion slope of the WDM signal beam is different from that of the dispersion compensator and the dispersion value is also different from that of the WDM signal beam for transmission of 100 km.

FIG. 5(b) illustrates the process of dispersion compensation of the 10-wave WDM signal beams in the wavelengths of 1532 nm to 1550 nm transmitted through the NZDSF transmission line of 130 km. Chromatic dispersions indicated with the mark □ of the WDM signal beam input to the dispersion compensator 1A increases, as in the case of the transmission for 100 km in FIG. 3, with increase in wavelength due to the dispersion slope of NZDSF in the transmission line, but both dispersion slope and dispersion amount are larger than that in the transmission for 100 km.

Accordingly, the dispersion compensation amount by the DCF 30A must be larger than that for the transmission of 100 km and the wavelength of pumped light beam becomes 1554 nm which is shorter than that in the transmission of 100 km (1560 nm) as illustrated in FIG. 4(b).

The signal beams λ1 to λ10 in the wavelengths of 1532 nm to 1550 nm input to the dispersion compensator 1A are multiplexed with the excited light beam output from the LD 21A with the WDM coupler 23A and are then input to the highly non-linear fiber 20A. With wavelength conversion by the DFWM in the highly non-linear fiber 20A, the signal beams λ1 to λ10 are respectively converted to the light beams in the wavelengths of 1577 nm to 1558 nm indicated with the mark Δ in FIG. 5(b).

The signal beams λ1 to λ10 wavelength-converted with the highly non-linear fiber 20A are input to the DCF 30A and then output as the light beams, in which the dispersion slope and dispersion value are reduced, as indicated with the mark ○ in FIG. 5(b). Since the dispersion slope of the input WDM signal beam is not identical to that of the DCF 30A, dispersion slope also remains in the signal beam (○) after the dispersion compensation but the value thereof is smaller than the dispersion slope of the input WDM signal beam (□).

The signal beams λ1 to λ10 dispersion-compensated by the DCF 30A are multiplexed with the excited light beam output from the LD 21A in the WDM coupler 23B and are then input to the highly non-linear fiber 20B. With wavelength conversion by the DFWM in the highly non-linear fiber 20B, the signal beams λ1 to λ10 are converted to the light beams in the wavelengths of 1532 nm to 1550 nm indicated with the mark ● FIG. 5(a) and are then output to the dispersion compensator 1A. The wavelength of the light beam wavelength-converted with the highly non-linear fiber 20B is identical to the wavelength of the input signal beam as in the case of transmission of 100 km.

With the process described above, the WDM signal beam input to the dispersion compensator 1A based on this embodiment is compensated, even in the case of transmission for 130 km, in dispersion slope and dispersion amount of chromatic dispersion and are then output even when the dispersion slope is different from that of the dispersion compensator and the dispersion value is different from that of the WDM signal beam for transmission of 100 km.

As described above, the dispersion compensator 1A based on the first embodiment can realize the dispersion compensation to reduce the dispersion slop and dispersion amount almost to zero not only for the WDM signal beam for transmission for 100 km but also for the WDM signal beam after transmission of the other transmission distances by changing the output wavelength of the LD 21A.

Next, the second embodiment of the present invention will be described.

Figure 6:
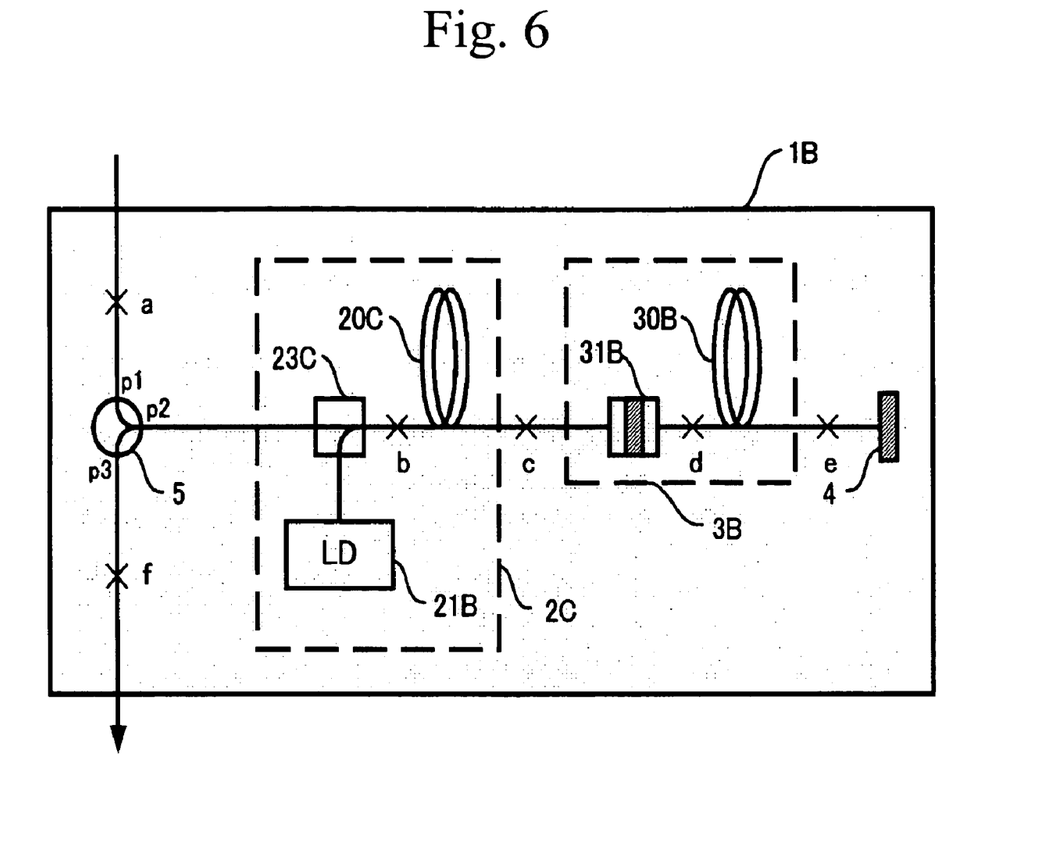
FIG. 6 is a diagram illustrating a dispersion compensator based on a second embodiment of the present invention.

FIG. 6 is a diagram illustrating a dispersion compensator based on the second embodiment. In FIG. 6, the dispersion compensator 1B based on the second embodiment is composed of a wavelength converting portion 2C, a dispersion compensating portion 3B, a reflecting portion 4, a circulator 5 and a filter 31B.

The dispersion compensator 1B based on the second embodiment is the configured to change the amount of dispersion compensation by conducting twice the wavelength conversion as in the case of the dispersion compensator 1A based on the first embodiment illustrated in FIG. 1 through the folding of the signal using the reflecting portion 4.

The circulator 5 is a non-reciprocal optical component having three ports p1 to p3 to output the light beam input to the port p1 to the port p2 and to output the light beam input to the port p2 to the port p3.

The wavelength converting portion 2C is provided with the LD 21B, WDM coupler 23C and highly non-linear fiber 20C to output the WDM signal beam received from the port p2 of the circulator 5 to the dispersion compensator 3B through wavelength conversion and to output the WDM signal beam received from the dispersion compensator 3B to the port p2 of the circulator 5 through wavelength conversion.

The LD 21B outputs an excited light beam which becomes the pumped light beam for the DFWM in the highly non-linear fiber 20C and changes the output wavelength of the excited light beam under external control.

The WDM coupler 23C multiplexes the excited light beam output from the LD 21B and the WDM signal beam input from the port p2 of the circulator 5 and then outputs the multiplexed light beam to the highly non-linear fiber 20C.

The highly non-linear fiber 20C outputs the idler light beam obtained by the wavelength conversion of the input WDM signal beam with the DFWM in which the light beam input through the WDM coupler 23C is defined as the pumped light beam and the WDM signal beam is defined as the probe light beam.

The dispersion compensating portion 3B is provided with the DCF 30B and filter 31B for outputting the WDM signal beam input from the wavelength converting portion 2C to the reflecting portion 4 and compensating the chromatic dispersion and for outputting the WDM signal beam input from the reflecting portion 4 and compensating the chromatic dispersion.

The DCF 30B is the fiber having the dispersion characteristic for changing the amount of dispersion compensation with wavelength and compensates the dispersion slope and chromatic dispersion of the WDM signal beam input from the wavelength converting portion 2C and reflecting portion 4.

The filter 31B filters the WDM signal beam input to the dispersion compensator 3B from the wavelength converting portion 2C and then outputs this signal beam to the DCF 30B.

The reflecting portion 4 reflects the WDM signal beam output from the dispersion compensating portion 3B and can use, for example, a total reflection film consisting of a dielectric multilayer film.

The WDM signal beam output from the wavelength converting portion 2C is dispersion-compensated with the dispersion compensating portion 3B and the reflecting portion 4 and is then input again to the wavelength converting portion 2C.

Next, operation of the dispersion compensator based on the second embodiment will be described.

The dispersion compensator 1B based on the second embodiment is capable of changing amount of dispersion compensation by providing twice the wavelength conversion as the dispersion compensator 1A based on the first embodiment. The process of dispersion compensation, in the second embodiment, of the light beam (indicated with the mark □ in FIG. 3) after transmission for 100 km with the NZDSF of the WDM signal beam obtained by multiplexing the 10-wave signal beams (wavelength: 1532 nm to 1550 nm) allocated at equal intervals will be described.

The signal beams λ1 to λ10 in the wavelengths of 1532 nm to 1550 nm, which has the dispersion slope and dispersion amount indicated with the mark □ in FIG. 3, and which is input to the dispersion compensator 1B, are input to the port p1 of the circulator 5, output from the port p2, and are then input to the wavelength converting portion 21C. The WDM signal beam input to the wavelength converting portion 21 is multiplexed with the excited light beam output from the LD21B with the WDM coupler 23C and is then input to the highly non-linear fiber 20C.

In the highly non-linear fiber 20C, the DFWM is generated with the light beam output from the LD 21B defined as the pumped light beam and the signal beams λ1 to λ10 in the wavelengths of 1532 nm to 1550 nm defined as the probe light beam and these signal beams λ1 to λ10 are then converted to light beams in the wavelengths of 1589 nm to 1570 nm indicated with the mark Δ in FIG. 3. The signal beams λ1 to λ10 wavelength-converted with the highly non-linear fiber 20C are output from the wavelength converting portion 2C and input to the filter 31B.

As the filter 31B, a filter for shielding the wavelength of excited light beam transmitted from the LD21B, a filter for shielding the wavelength of the light beam not wavelength-converted with the wavelength converting portion 2C, or a filter combining the filters described above may be used.

When the filter for shielding the wavelength of the excited light beam transmitted from the LD 21B is used as the filter 31B, the filter 31B shields the light beam which is not converted with the DFWM by the highly non-linear fiber 20C and is output from the wavelength converting portion 2C among the excited light beams transmitted from the LD21B. The signal beams λ1 to λ10 wavelength-converted with the wavelength converting portion 2C are transmitted through the filter 31B.

Accordingly, since the excited light beam is not input to the DCF 30A in the subsequent stage of the filter 31A, deterioration of signal beam due to generation of the non-linear optical phenomenon such as DFWM or the like in the DCF 30A may be prevented.

When the filter for shielding the wavelength of light beam not wavelength-converted with the wavelength converting portion 2C is used as the filter 31B, the filter 31B shields the light beam not converted with the DFWM by the highly non-linear fiber 20C and is then output from the wavelength converting portion 2C among the input signal beams. The signal beams λ1 to λ10 wavelength-converted with the wavelength converting portion 2C are transmitted through the filter 31B.

Accordingly, after the wavelength conversion with the wavelength converting portion 2C, the signal beam not wavelength-converted with the wavelength converting portion 2C, reflected with the reflecting portion 4, and not wavelength-converted with the wavelength converting portion 2C is mixed with the signal beam wavelength-converted with the wavelength converting portion 2C, reflected with the reflecting portion 4 and wavelength-converted again to the wavelength equal to that of the input light beam with the wavelength converting portion 2C. Thereby, deterioration of the signal beam may be prevented. For example, when the input WDM signal beams are all in the C band region (1.55 μm band; about 1.53 μm to about 1.56 μm) and the WDM signal beams after the wavelength conversion are all in the region outside the C band region, the wavelength of the light beam not wavelength-converted with the wavelength converting portion 2C is shielded with use of the C band shielding filter.

As the excited light beam shielding filter and the C band shielding filter, a filter consisting of the dielectric layer film can be used.

The signal beams λ1 to λ10 input to the dispersion compensating portion 3B after transmission through the filter 31B are compensated in dispersion with the DCF 30B and are then output to the dispersion compensating portion 3B. The signal beams λ1 to λ10 output from the dispersion compensating portion 3B are reflected by the reflecting portion 4 and then input again to the dispersion compensating portion 3B. These signal beams are compensated in the dispersion with the DCF 30B and are then output from the dispersion compensating portion 3B after transmission through the filter 31A.

When the dispersion slope of the DCF 30B is half of the dispersion slope of the dispersion compensation fiber illustrated in FIG. 3, the signal beams are reflected with the reflecting portion 4 after the dispersion compensation with the DCF 30B and compensated again in dispersion with the DCF 30B. Accordingly, since the dispersion compensation amount of signal beam becomes equal to the dispersion compensation amount of the dispersion compensation fiber illustrated in FIG. 3, the dispersion slope and dispersion value of the signal beams λ1 to λ10 indicated with the mark ○ in FIG. 3 become almost zero.

The signal beams λ1 to λ10 output from the dispersion compensating portion 3B are input to the wavelength converting portion 2B, wavelength-converted with the DFWM in the highly non-linear fiber 20C and are then output to the port p2 of the circulator 5. It is apparent that wavelength of the probe light beam in the DFWM2 (return DFWM process) is equal to that of the idler light beam in the DFWM1 (forward DFWM process). The wavelengths of the pumped light beams in the DFWM1 and DFWM2 are used in common when the DFWM2 (in which the output light beam of the LD 21B is defined as the pumped light beam and the signal beams λ1 to λ10 output to the highly non-linear fiber 20C from the dispersion compensating portion 3B are defined as the probe light beams), is compared with the DFWM1 (in which the light beam output from the LD 21B is defined as the pumped light beam and the signal beams λ1 to λ10 output to the highly linear fiber 20C from the port p2 of the circulator 5 are defined as the probe light beams). Therefore, each wavelength of the idler light beam by the DFWM2 becomes equal to the wavelength of the probe light beam of the DFWM1, namely to each wavelength of the WDM signal beam input to the dispersion compensating portion 1B.

The signal beams λ1 to λ10 output after the wavelength conversion with the wavelength converting portion 2B are input to the port p2 of the circulator 5, output from the port p3, and are then output from the dispersion compensator 1B.

The WDM signal beam input to the dispersion compensator 11B based on this embodiment with the process described above is compensated in dispersion slope and dispersion amount of chromatic dispersion and are then output. In this embodiment, the signal beam is reflected with the reflecting portion 4 and the dispersion compensation similar to provided in the first embodiment can be realized with the structure comprising a wavelength converting portion by utilizing the circulator 5.

In the dispersion compensator based on the first and second embodiments, the desired dispersion compensation amount can be obtained through variation of the dispersion compensation amount by previously measuring the characteristic of the dispersion compensating portion and performing wavelength conversion conforming to the measured characteristic.

Particularly, when characteristics of dispersion compensation are different in each device, the desired dispersion compensation amount can be obtained by adjusting the conversion wavelength of the signal beam with the wavelength converting portion by previously measuring the characteristic of the dispersion compensating portion and by introducing such characteristic to the dispersion compensator of the present invention.

Moreover, when a fiber that provides a chromatic dispersion value of almost zero in the wavelength region of the input WDM signal beam is used as the highly non-linear fiber used in the first and second embodiments, since the phases of light beams are easily aligned within the highly non-linear fiber, the wavelength conversion by the DFWM is performed effectively.

As described above, since the conversion wavelength of the degenerated four-wave mixing (DFWM) in the highly non-linear fiber is controlled by changing the wavelength of the excited light beam, the amount of dispersion compensation of the dispersion compensator is varied by changing the wavelength of the excited light beam.

Moreover, since the wavelength conversion is performed with degenerated four-wave mixing (DFWM), when the wavelength of the pumped light beam is identical, a light beam of wavelength identical to that of the input light beam can be output through repeated wavelength conversion with the degenerated four-wave mixing (DFWM).

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A dispersion compensator comprising:
   a first wavelength converting portion operable to receive an input light beam having a first wavelength, to convert the first wavelength of the input light beam to a second wavelength, and to output the converted light beam having the second wavelength;
   a dispersion compensating portion operable to receive the converted light beam having the second wavelength, to provide a variable amount of dispersion compensation depending on the second wavelength of the converted light beam, and to output a compensated light beam having the second wavelength; and
   a second wavelength converting portion operable to receive the compensated light beam having the second wavelength, convert the second wavelength of the compensated light beam to the first wavelength, and to output a compensated light beam having the first wavelength;
   wherein the second wavelength is variable so as to control the amount of dispersion compensation.

2. The dispersion compensator of claim 1, wherein the first wavelength converting portion comprises:
   a light source operable to output a light beam at variable wavelengths;
   a coupler operable to multiplex the light beam output from the light source with the input light beam having a first wavelength; and
   a mixer operable to output the converted light beam having the second wavelength, wherein the second wavelength is dependent upon a wavelength of the light beam output from the light source.

3. The dispersion compensator of claim 2, wherein the wavelength of the light source is changeable with external control.

4. The dispersion compensator of claim 2, wherein the mixer comprises a highly non-linear fiber.

5. The dispersion compensator of claim 2, wherein the light source is a laser diode.

6. The dispersion compensator of claim 2, wherein the mixer operates as a degenerate four wave mixer.

7. The dispersion compensator of claim 6, wherein the light beam output from the light source is the pumped light beam in the degenerate four wave mixer and the input light beam is the probe light beam in the degenerate four wave mixer.

8. The dispersion compensator of claim 2, wherein the dispersion compensating portion comprises:
   a filter operable to receive and filter the converted light beam having the second wavelength and output a filtered light beam having the second wavelength; and
   a dispersion compensation fiber having a dispersion characteristic and operable to receive the filtered light beam having the second wavelength, compensate for dispersion in the filtered light beam having the second wavelength, wherein an amount of dispersion compensation depends upon the second wavelength, and output the compensated light beam having the second wavelength.

9. The dispersion compensator of claim 8, wherein the filter is operable filter out the light beam output from the light source.

10. The dispersion compensator of claim 8, wherein the filter is operable to filter out the input light beam having the first wavelength.

11. The dispersion compensator of claim 8, wherein the filter is operable filter out the light beam output from the light source and to filter out the input light beam having the first wavelength.

12. The dispersion compensator of claim 8, wherein the filter comprises a dielectric multilayer film.

13. The dispersion compensator of claim 8, wherein the second wavelength converting portion comprises:
   a coupler operable to multiplex the light beam output from the light source of the first wavelength converting portion with the compensated light beam having the second wavelength; and
   a mixer operable to output the compensated light beam having the first wavelength.

14. The dispersion compensator of claim 13, wherein the mixer comprises a highly non-linear fiber.

15. The dispersion compensator of claim 13, wherein the mixer operates as a degenerate four wave mixer.

16. The dispersion compensator of claim 6, wherein the light beam output from the light source is the pumped light beam in the degenerate four wave mixer and the compensated light beam having the second wavelength is the probe light beam in the degenerate four wave mixer.

17. A dispersion compensator comprising:
   an optical component including a first port, a second port, and a third port, the first port operable to receive an input light beam, the second port operable to output the input light beam received by the first port and to receive a second input light beam, and the third port operable to output the second input light beam received by the second port, wherein the input light beam received by the first port has a first wavelength;
   a wavelength converting portion operable to receive the input light beam having the first wavelength output from the second port, to convert input light beam having the first wavelength to a second wavelength, and to output the converted light beam having the second wavelength;
   a dispersion compensating portion operable to receive the converted light beam having the second wavelength, to provide a variable amount of dispersion compensation depending on the second wavelength of the converted light beam, and to output a compensated light beam having the second wavelength; and a reflecting portion operable to receive the compensated light beam and to reflect the compensated light beam back to the dispersion compensating portion;

wherein the second wavelength is variable so as to control the amount of dispersion compensation.

18. The dispersion compensator of claim 17, wherein the wavelength converting portion comprises:
a light source operable to output a light beam at variable wavelengths;
a coupler operable to multiplex the light beam output from the light source with the input light beam having a first wavelength; and
a mixer operable to output the converted light beam having the second wavelength, wherein the second wavelength is dependent upon a wavelength of the light beam output from the light source.

19. The dispersion compensator of claim 18, wherein the wavelength of the light source is changeable with external control.

20. The dispersion compensator of claim 18, wherein the mixer comprises a highly non-linear fiber.

21. The dispersion compensator of claim 18, wherein the light source is a laser diode.

22. The dispersion compensator of claim 18, wherein the mixer operates as a degenerate four wave mixer.

23. The dispersion compensator of claim 22, wherein the light beam output from the light source is the pumped light beam in the degenerate four wave mixer and the input light beam is the probe light beam in the degenerate four wave mixer.

24. The dispersion compensator of claim 18, wherein the dispersion compensating portion comprises:
a filter operable to receive and filter the converted light beam having the second wavelength and output a filtered light beam having the second wavelength; and
a dispersion compensation fiber having a dispersion characteristic and operable to receive the filtered light beam having the second wavelength, compensate for dispersion in the filtered light beam having the second wavelength, wherein an amount of dispersion compensation depends upon the second wavelength, and output the compensated light beam having the second wavelength.

25. The dispersion compensator of claim 24, wherein the filter is operable filter out the light beam output from the light source.

26. The dispersion compensator of claim 24, wherein the filter is operable to filter out the input light beam having the first wavelength.

27. The dispersion compensator of claim 24, wherein the filter is operable filter out the light beam output from the light source and to filter out the input light beam having the first wavelength.

28. The dispersion compensator of claim 24, wherein the filter comprises a dielectric multilayer film.

29. The dispersion compensator of claim 24, wherein the reflecting portion comprises a total reflection film including a dielectric multilayer film.

30. The dispersion compensator of claim 17, wherein the dispersion compensating portion is further operable to receive the reflected compensated light beam to provide a further variable amount of dispersion compensation depending on the second wavelength of the reflected converted light beam, and to output a second compensated light beam having the second wavelength.

31. The dispersion compensator of claim 30, wherein the wavelength converting portion is further operable to receive second compensated light beam having the second wavelength, to convert second compensated light beam having the second wavelength to the first wavelength to form a second converted light beam having the first wavelength, and to output the second converted light beam having the first wavelength to the second port of the optical component.

32. The dispersion compensator of claim 31, wherein the optical component is further operable to receive the second converted light beam having the first wavelength to the second port and to output the second converted light beam having the first wavelength from the third port.

33. The dispersion compensator of claim 32, wherein the wavelength converting portion comprises:
a light source operable to output a light beam at variable wavelengths;
a coupler operable to multiplex the light beam output from the light source with the input light beam having a first wavelength; and
a mixer operable to output the converted light beam having the second wavelength, wherein the second wavelength is dependent upon a wavelength of the light beam output from the light source.

34. The dispersion compensator of claim 33, wherein the wavelength of the light source is changeable with external control.

35. The dispersion compensator of claim 33, wherein the mixer comprises a highly non-linear fiber.

36. The dispersion compensator of claim 33, wherein the light source is a laser diode.

37. The dispersion compensator of claim 33, wherein the mixer operates as a degenerate four wave mixer.

38. The dispersion compensator of claim 37, wherein the light beam output from the light source is the pumped light beam in the degenerate four wave mixer and the input light beam is the probe light beam in the degenerate four wave mixer.

39. The dispersion compensator of claim 33, wherein the dispersion compensating portion comprises:
a filter operable to receive and filter the converted light beam having the second wavelength and output a filtered light beam having the second wavelength; and
a dispersion compensation fiber having a dispersion characteristic and operable to receive the filtered light beam having the second wavelength, compensate for dispersion in the filtered light beam having the second wavelength, wherein an amount of dispersion compensation depends upon the second wavelength, and output the compensated light beam having the second wavelength.

40. The dispersion compensator of claim 39, wherein the filter is operable filter out the light beam output from the light source.

41. The dispersion compensator of claim 39, wherein the filter is operable to filter out the input light beam having the first wavelength.

42. The dispersion compensator of claim 39, wherein the filter is operable filter out the light beam output from the light source and to filter out the input light beam having the first wavelength.

43. The dispersion compensator of claim 39, wherein the filter comprises a dielectric multilayer film.

44. The dispersion compensator of claim 39, wherein the reflecting portion comprises a total reflection film including a dielectric multilayer film.

45. A method for dispersion compensation of a light beam comprising the steps of:
receiving an input light beam having a first wavelength;

converting the input light beam to a selected second wavelength to form a converted light beam having the second wavelength;

compensating dispersion of the converted light beam having the second wavelength in an amount dependent upon the second wavelength to form a compensated light beam having the second wavelength; and converting the compensated light beam having the second wavelength to the first wavelength;

wherein the second wavelength is variable so as to control the amount of dispersion compensation.

46. The method of claim 45, wherein the step of converting the input light beam to a selected second wavelength comprises the steps of:

generating a light beam at a selected wavelength;

multiplexing the generated light beam with the input light beam having the first wavelength; and mixing the generated light beam with the input light beam having the first wavelength to form the converted light beam having the second wavelength, wherein the second wavelength is dependent upon the selected wavelength of the generated light beam.

47. The method of claim 46, wherein the step of generating a light beam at a selected wavelength comprises the step of selecting the wavelength with external control.

48. The method of claim 46, wherein the step of mixing the generated light beam with the input light beam comprises the step of mixing the generated light beam with the input light beam in a degenerate four wave mixer.

49. The method of claim 46, wherein the generated light beam is the pumped light beam in the degenerate four wave mixer and the input light beam is the probe light beam in the degenerate four wave mixer.

50. The method of claim 46, wherein the dispersion compensating step comprises the steps of:

filtering the converted light beam having the second wavelength to form a filtered light beam having the second wavelength; and compensating for dispersion in the filtered light beam having the second wavelength to form the compensated light beam having the second wavelength, wherein an amount of dispersion compensation depends upon the second wavelength.

51. The method of claim 50, wherein the filtering step comprises the step of filtering out the generated light beam.

52. The method of claim 50, wherein the filtering step comprises the step of filtering out the input light beam having the first wavelength.

53. The method of claim 50, wherein the filtering step comprises the step of filtering out filtering out the generated light beam and the input light beam having the first wavelength.

54. The method of claim 45, further comprising the steps of:

before converting the compensated light beam having the second wavelength to the first wavelength, reflecting the compensated light beam;

compensating dispersion of the reflected compensated light beam to provide a further variable amount of dispersion compensation in an amount dependent upon the second wavelength to form a compensated light beam having the second wavelength; and wherein the step of converting the compensated light beam having the second wavelength to the first wavelength comprises the step of converting the second compensated light beam having the second wavelength to the first wavelength.

55. The method of claim 54, wherein the step of converting the input light beam to a selected second wavelength comprises the steps of:

generating a light beam at a selected wavelength;

multiplexing the generated light beam with the input light beam having the first wavelength; and mixing the generated light beam with the input light beam having the first wavelength to form the converted light beam having the second wavelength, wherein the second wavelength is dependent upon the selected wavelength of the generated light beam.

56. The method of claim 55, wherein the step of generating a light beam at a selected wavelength comprises the step of selecting the wavelength with external control.

57. The method of claim 55, wherein the step of mixing the generated light beam with the input light beam comprises the step of mixing the generated light beam with the input light beam in a degenerate four wave mixer.

58. The method of claim 55, wherein the generated light beam is the pumped light beam in the degenerate four wave mixer and the input light beam is the probe light beam in the degenerate four wave mixer.

59. The method of claim 55, wherein step of compensating dispersion of the compensated light beam comprises the steps of:

filtering the converted light beam having the second wavelength to form a filtered light beam having the second wavelength; and compensating for dispersion in the filtered light beam having the second wavelength to form the compensated light beam having the second wavelength, wherein an amount of dispersion compensation depends upon the second wavelength.

60. The method of claim 59, wherein the filtering step comprises the step of filtering out the generated light beam.

61. The method of claim 59, wherein the filtering step comprises the step of filtering out the input light beam having the first wavelength.

62. The method of claim 59, wherein the step of compensating dispersion of the reflected compensated light beam comprises the steps of:

filtering the reflected compensated light beam having the second wavelength to form a filtered reflected compensated light beam having the second wavelength; and compensating for dispersion in the filtered reflected compensated light beam having the second wavelength to form the second compensated light beam having the second wavelength, wherein an amount of dispersion compensation depends upon the second wavelength.

63. The method of claim 62, wherein the filtering step comprises the step of filtering out the generated light beam.

64. The method of claim 62, wherein the filtering step comprises the step of filtering out the input light beam having the first wavelength.

65. The method of claim 62, wherein the filtering step comprises the step of filtering out filtering out the generated light beam and the input light beam having the first wavelength.

* * * * *